United States Patent
Grgac et al.

(10) Patent No.: US 11,285,894 B2
(45) Date of Patent: Mar. 29, 2022

(54) STRUCTURAL MODULE ASSEMBLY HAVING OVERMOLDED ELECTRICALLY CONDUCTIVE REINFORCEMENTS

(71) Applicant: Magna Exteriors Inc., Concord (CA)

(72) Inventors: Steven S. Grgac, Mississauga (CA); Philip Grella, Newmarket (CA)

(73) Assignee: Magna Exteriors Inc., Concord (CA)

( * ) Notice: Subject to any disclaimer, the term of this patent is extended or adjusted under 35 U.S.C. 154(b) by 672 days.

(21) Appl. No.: 16/069,790

(22) PCT Filed: Jan. 16, 2017

(86) PCT No.: PCT/IB2017/050227
§ 371 (c)(1),
(2) Date: Jul. 12, 2018

(87) PCT Pub. No.: WO2017/122186
PCT Pub. Date: Jul. 20, 2017

(65) Prior Publication Data
US 2019/0039538 A1    Feb. 7, 2019

Related U.S. Application Data

(60) Provisional application No. 62/278,785, filed on Jan. 14, 2016.

(51) Int. Cl.
*B60R 16/023* (2006.01)
*B62D 25/08* (2006.01)
(Continued)

(52) U.S. Cl.
CPC ............ *B60R 16/023* (2013.01); *B60R 16/03* (2013.01); *B62D 21/17* (2013.01); *B62D 25/085* (2013.01);
(Continued)

(58) Field of Classification Search
CPC ....... B60R 16/023; B60R 16/03; B62D 21/17; B62D 29/046; B62D 29/004; B62D 29/043; B62D 25/085; H04W 4/48
See application file for complete search history.

(56) References Cited

U.S. PATENT DOCUMENTS 6,177,867 B1    1/2001  Simon et al.
8,552,668 B2 *  10/2013 Hogenmueller ...... B60R 16/023
                                                                318/16
(Continued)

FOREIGN PATENT DOCUMENTS

DE    19715824-02    *  2/2001 ............... H02G 5/04
DE    10338823 A1       3/2005
(Continued)

OTHER PUBLICATIONS

International Search Report for Application No. PCT/IB2017/050227, dated Apr. 11, 2017.

*Primary Examiner* — Zhitong Chen
(74) *Attorney, Agent, or Firm* — Warn Partners, P.C.

(57) ABSTRACT

A structural module assembly with conductive reinforcements overmolded within the plastic and/or composite subassembly as a main power bus and a communication bus for electrical components assembled onto the module. Control signals are either transmitted between a main microcontroller and another microcontroller by way of the communication bus or wirelessly. The microcontrollers determine which electrical components to activate, and power is provided to the electrical components by way of the main power bus.

18 Claims, 7 Drawing Sheets

(51) Int. Cl.
*B62D 21/17* (2006.01)
*B62D 29/04* (2006.01)
*B62D 29/00* (2006.01)
*H04W 4/48* (2018.01)
*B60R 16/03* (2006.01)

(52) U.S. Cl.
CPC ......... *B62D 29/004* (2013.01); *B62D 29/043* (2013.01); *B62D 29/046* (2013.01); *H04W 4/48* (2018.02)

(56) References Cited

U.S. PATENT DOCUMENTS

| | | |
|---|---|---|
| 8,950,802 B2 | 2/2015 | Hasl |
| 2005/0040969 A1 | 2/2005 | Heyn |
| 2016/0001781 A1* | 1/2016 | Fung ..................... B60K 28/02 |
| | | 701/36 |
| 2017/0125989 A1* | 5/2017 | Kischkat ................. H02G 3/04 |
| 2017/0264111 A1* | 9/2017 | Komatsu ............... H02J 7/0021 |

FOREIGN PATENT DOCUMENTS

| | | |
|---|---|---|
| DE | 102011016235 A1 | 12/2011 |
| DE | 102013101801 A1 | 8/2014 |
| JP | 2014169009 A | 9/2014 |

* cited by examiner

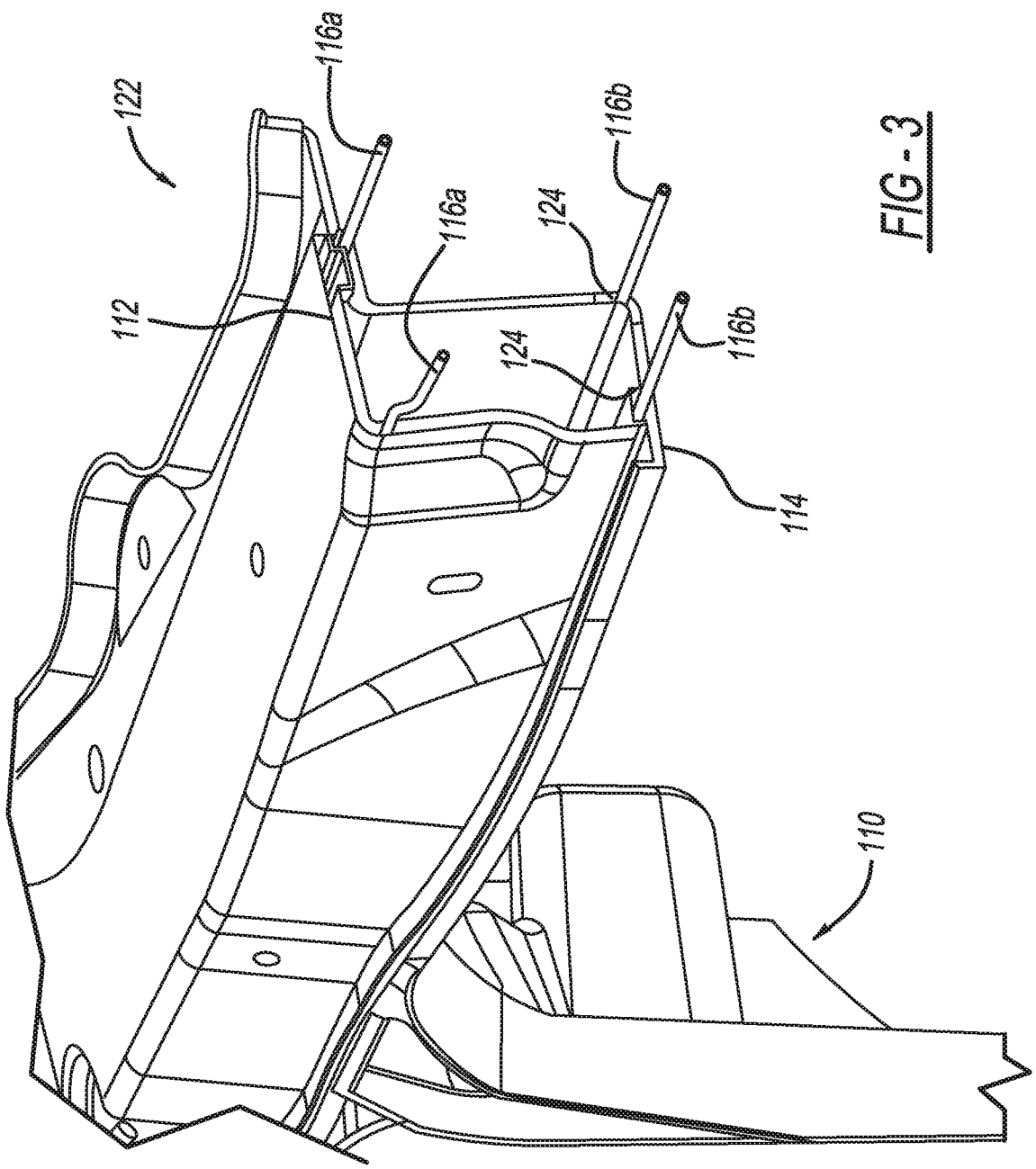

STRUCTURAL MODULE ASSEMBLY HAVING OVERMOLDED ELECTRICALLY CONDUCTIVE REINFORCEMENTS

CROSS-REFERENCE TO RELATED APPLICATIONS

This application is a National Stage of PCT International Application No. PCT/IB2017/050227, filed Jan. 16, 2017, which claims the benefit of U.S. Provisional Patent Application No. 62/278,785, filed Jan. 14, 2016. The disclosures of the above applications are incorporated herein by reference.

FIELD OF THE INVENTION

The present invention relates to plastic and/or composite assembly modules that transmit power and activate electrical components assembled to the modules, such as automotive front end carrier modules.

BACKGROUND OF THE INVENTION

Generally, structural parts are used for supporting structures in motor vehicles, in particular as transverse supporting members in motor vehicles, to create a connection to the motor vehicle for the electrical components assembled to the structural parts. Typically, supporting members have a number of electrical components assembled to the member and interconnected to the vehicle body using an auxiliary wiring harness. These are then supplied to vehicle assembly plants that install the complete assembly to vehicles. The wiring harnesses provide electrical power and control signals to the electrical components based on vehicle operator inputs, such as headlights, signal lights, horn, washer fluid, and/or general vehicle operation such as cooling fan, temperature sensors, airbag sensors, active grille shutters, and etc. Wiring harnesses, such as on a typical front end carrier module assembly, are substantial due to the high number of assembled electrical components, which adds to vehicle weight, module cost and complexity.

Supporting members may have metallic filaments along the part length. These filaments act as tension and compression members to improve the strength of the beam section especially when two injection molded parts with overmolded filaments are welded together forming an enclosure. Compatibility coatings applied to the metallic rods further improves the mechanical performance of the overmolded beam section by chemically bonding the rods to the resin substrate. U.S. Pat. No. 8,950,802 B2, which is incorporated herein by reference, has a method of improving performance of an injection molded composite structure by overmolding metallic reinforcing filaments along the part length.

Further developments are described in U.S. Pat. No. 6,177,867 B1, which is incorporated herein by reference. Use of wireless transmitters to wirelessly control electrical components throughout a vehicle is generally known. Signals to turn on headlamps, signal indicators, brake lights, etc. are activated by an operator inside the vehicle. These signals are sent to a microprocessor and a transmitter that generates and transmits the desired signal wirelessly. Another microprocessor and receiver located at both the front and rear of the vehicle receive the transmitted signal and turn on the lights as required by the vehicle operator. The wireless signals transmitted to the microprocessors control the electrical power supplied to the lights via a power bus connected from the power source to the lights. Further developments are described in U.S. Pat. No. 8,552,668, which is incorporated herein by reference. In a generally known system, there is additionally the incorporation of other wirelessly actuated vehicular components including a heating element, an electrical motor or actuation via a switch. An electrical conductor supplies electrical power to all the components from the power source. However, these known systems require a conductor to supply power to the receiver, microprocessor, and the electrical component. Although this method may reduce the number of wires necessary to supply power and control the electrical component, relative to prior conventional methods, it does not reduce assembly complexity to warrant change from traditional assembly methods.

Further developments are described in US20050040969, which is incorporated herein by reference. Electrical component activation using wireless transmission signals throughout a vehicle is generally known. The components for activation include sliding roof drives, window lift drives, and a magnet lifting drive. Actuators for each of the components may include a rechargeable energy storage device connected to vehicle power that allows wire communication with the actuator unit without relying on power from the vehicle or production line. This allows integration of new functions, coding and parameter settings regardless of whether vehicle power is available from the supply line. Again, there is required a conductor to supply power to the receiver, microprocessor, and the electrical component. Thus, although this method may reduce the number of wires necessary to supply power and control the electrical component, relative to prior conventional methods, it does not reduce assembly complexity to warrant change from traditional assembly methods.

Further developments are described in DE 10338823 A1, which is incorporated herein by reference. A motor vehicle wireless bus system providing for the wireless transfer of energy and data between actuators and sensors in a vehicle control and information system is generally known. Wireless communication using wireless CAN bus systems to transmit signals between moving and stationary components within a vehicle, such as speaker signals in doors, is known generally. Power to the speaker is transmitted by induction for a truly wireless solution. However, using induction and wireless technology to transmit power and signals for remote operation of an electrical component is problematic since transmitting power by induction is highly inefficient, especially at distances commonly found within a vehicle.

Accordingly, for all these reasons, there exists a need for a module assembly incorporating metallic rods as structural reinforcements and as an electrical conductor to eliminate the need for an auxiliary wiring harness to connect module components to a vehicle body.

SUMMARY OF THE INVENTION

The present invention generally relates to utilizing respective metallic reinforcements overmolded within a plastic and/or composite subassembly as a power bus and communication bus for electrical components assembled onto the module. In particular, structural module assemblies, e.g., an automotive assembly module, that transmit power for a plurality of electrical components through metallic reinforcements embedded within a composite matrix. The present invention improves the assembly strength in combination with reducing or eliminating cost, weight, and assembly complexities associated with wiring harnesses within plastic and/or composite module assemblies.

In accordance with one embodiment of the present invention, overmolded metallic structural reinforcements are provided in composite module assemblies, and additionally used as main power conductors to wirelessly activate electrical components on a module assembly, e.g., such as a front end module. In accordance with another embodiment of the present invention, overmolded metallic structural reinforcements are provided in composite assemblies, and additionally used as main power conductors and microcontroller communication bus conductors to activate electrical components operably assembled to a module assembly, e.g., such as a front end carrier module. Any other module assembly of any kind is contemplated dependent upon the particular applications without departing from the scope of the present invention. Typical electrical components that can be activated on a module assembly using either wireless or a communication bus include, but are not limited to, horns, washer fluid pump, ambient temperature sensor, airbag crash sensor, LH and RH headlamp assemblies, electrical hood latch, LH and RH turn signals, high and low beam headlights, parking light, coolant temp sensor, active grille shutter, etc.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of the front end carrier module assembly taken along 3-3 of FIG. 2 to expose reinforcement conductor rods, in accordance with the present invention;

DETAILED DESCRIPTION OF THE PREFERRED EMBODIMENTS

The following description of the preferred embodiment(s) is merely exemplary in nature and is in no way intended to limit the invention, its application, or uses.

Referring to the Figures of the application generally, the present invention is directed to a structural component module assembly (or "structural module assembly" or "module assembly") operable to selectively activate each of a predetermined plurality of electrical components assembled to the module assembly. In a particular embodiment of the invention, the assembly is a supporting member that is a front end carrier or "front end module", e.g., a cross car member supporting an instrument panel of a vehicle. However, it is within the scope of the invention for the module to be operably incorporated with any type of vehicle component, including, but not limited to, a tailgate assembly, bumper assembly, instrument panel assembly, interior consoles, running boards, roof racks, doors, lift gate assembly or any other type of vehicle component of any kind where at least one electrical component is selectively activated, which is described in greater detail below. The assembly has at least two structural reinforcement features that are also main power conductors and communication bus conductors.

Figure 1:
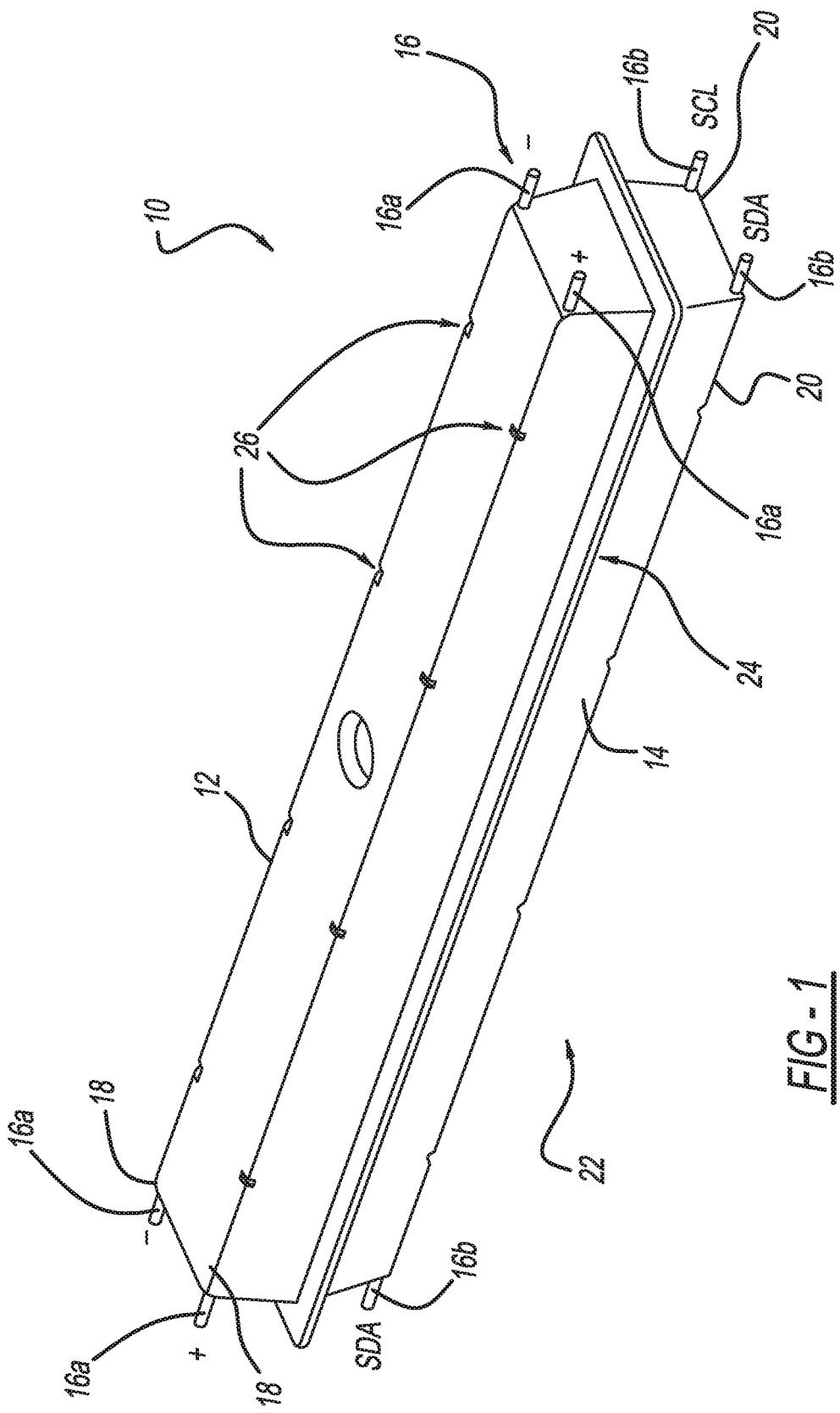
FIG. 1 is a perspective view of an enclosed beam section with exposed rods, according to an embodiment of the present invention.

Referring now to FIG. 1, there is depicted a structural part shown generally at 10, including at least two elongated half sections, first half or section 12 (e.g., top half) and second half 14 (e.g., bottom half), joined together. Preferably, the halves 12 and 14 are thermoplastic composite material. A plurality of conductor rods, indicated generally at 16, (e.g., metallic rods) are overmolded in the two halves 12, 14. The conductor rods 16 are conductive reinforcement rods. FIG. 1 depicts four conductor rods 16 overmolded adjacent the four top and bottom edges 18, 20 of the structural part 10. Each conductor rod 16 preferably runs along the longitudinal length of the structural part 10 at the four longitudinal edges of the part 10. Other locations, depending on the application, suitable for strength and conductivity are contemplated without departure from the scope of the present invention. More or less rods 16 are also contemplated depending on the application without departure from the scope of the present invention. While the cross section of the conductor rods 16 is preferably generally circular, it is understood that alternative cross sections are contemplated depending on the application without departure from the scope of the present invention. It is understood that the structural part 10 is exemplary, and, the invention is not limited to only a front end module.

The conductor rods 16 provide reinforcement in combination with being main power conductors and communication bus conductors. The conductor rods 16 provide connection points from a main voltage source for a wireless module, e.g., front end module, option and additional communication bus conductors for a microcontroller operated module assembly option. There is illustrated voltage source conductor rods 16a, 16a (e.g., upper first pair of conductor rods 16 along the top edges 18, 18 of the first half 12), and communication bus conductor rods 16b, 16b (lower second pair of conductor rods 16 along the bottom edges 20, 20 of the second half 14).

The ends of the conductor rods 16 are exposed at both transverse ends of the part 10, in one embodiment of the invention, to provide connection points from the main voltage source for a wireless front end module option and a microcontroller operated front end module, and, additional connection points for the communication bus conductors 16b for the microcontroller operated front end module option. According to another embodiment of the present invention, the conductor rods 16 do not extend outside the first and second halves 12 and 14. Rather, the conductor rods 16 are integrated into a socket receptacle at the transverse ends of the part 10 and throughout the length of the part 10 for attachment to at least one auxiliary electrical component.

Each half 12 and 14 has a projecting flange to seal the two halves 12, 14 together, indicated generally at 24. Both halves 12, 14 are welded together, creating an enclosed structural member generally indicated at 22 or beam section, using a thermoplastic welding technology. However, it is within the scope of the present invention that other suitable processes may be used to create the seams, depending on the applications.

Along the length of the structural member 22 at predetermined locations, a plurality of electrical connection points 26 are provided to make electrical connections with the respective electrical component(s) attached to the module 10 either directly or using at least one short wiring harness plugged into the conductive rods 16 of the composite member 22.

Figure 2:
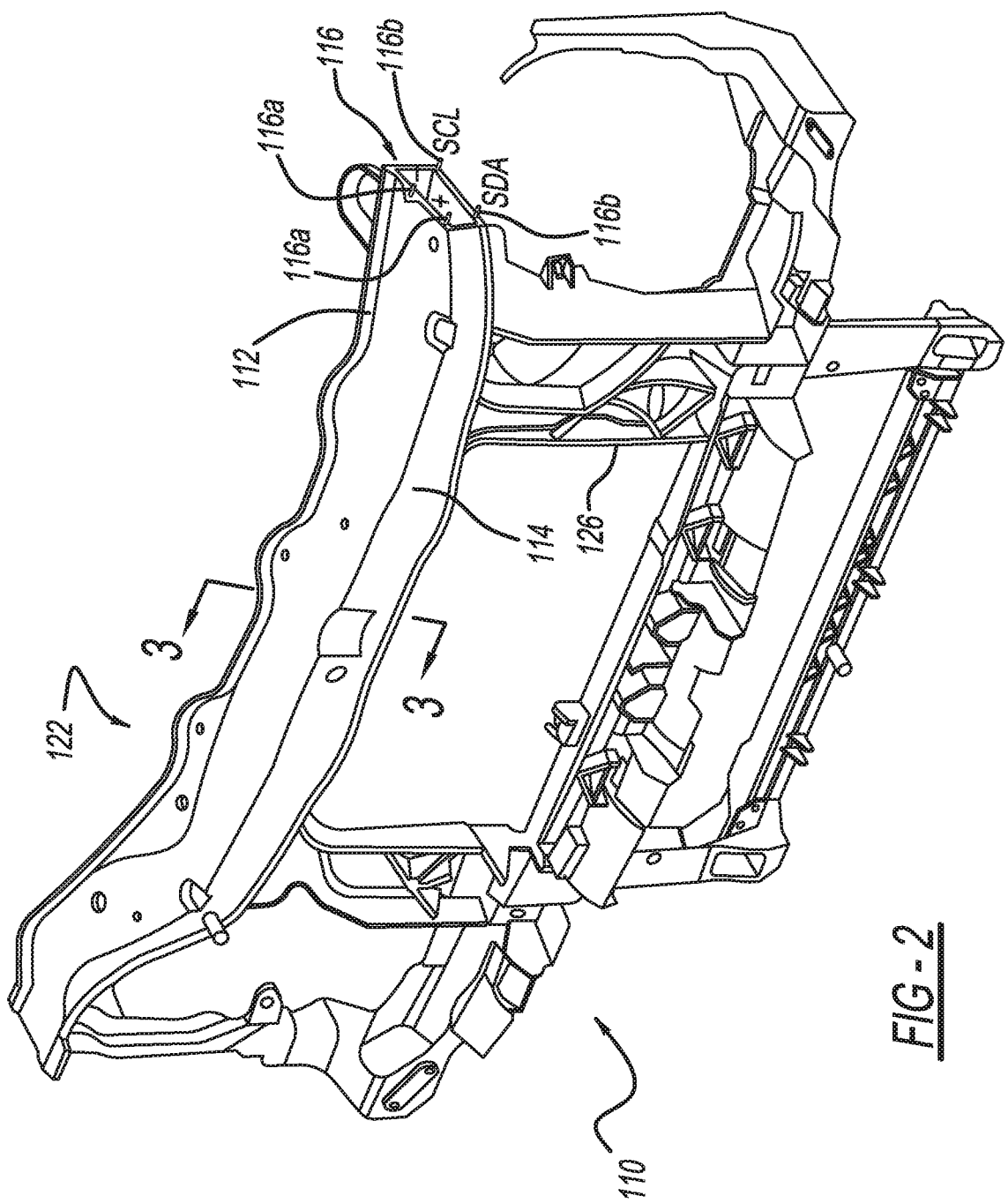
FIG. 2 is a perspective view of a front end carrier module assembly, in accordance another embodiment of the present invention.

FIGS. 2-3 illustrate a plurality of conductor rods shown generally at 116 overmolded in a two-piece structural part, e.g., a two piece composite front end carrier, shown generally at 110, in according to an embodiment of the present invention. The conductor rods 116 are conductive reinforcement rods. A first section 112, e.g., top half, of an enclosed structural member or beam has two conductor rods 116a overmolded directly within the part. The second section 114, e.g., lower half, of the front end carrier has another two conductor rods 116b overmolded into the part. Once the first and second sections 112 and 114 are welded together into an enclosure or "structural member" indicated generally at 122, the two pairs of conductor rods 116a, 116b are useable to transmit power and communication data to each of the attached electrical components. The conductor rods 116 provide connection points from the main voltage source for a wireless module assembly option, and, additionally, communication bus conductors for a microcontroller operated module assembly option.

In a preferred embodiment, the sections 112, 114 of the enclosure 122 are operably welded together. The reinforced enclosed member 122 is preferably largely hollow, further reducing weight and costs. The conductor rods 116 are preferably enclosed within channels 124 formed in the enclosure 122. The ends of the rods 116 are exposed at at least one transverse end of the part 122, in one embodiment of the invention, to provide connection points from the main voltage source for a wireless front end module option and a microcontroller operated front end module, and, to provide additional connection points for the communication bus conductors 116b for the microcontroller operated front end module options. According to another embodiment of the present invention, the conductor rods 116 do not extend outside the enclosed member 122. Rather, each conductor rod 116 is integrated into a socket receptacle (or bosses integrated into sockets) at least the transverse ends of the part for attachment to at least one auxiliary electrical component. Optionally, along the length of the member 122 at predetermined locations, at least one electrical connection point, preferably a plurality, are provided as electrical connection options for electrical components attached to the front end carrier. At least one lower carrier portion 126 is operably connected to the structural member 122.

Each conductor rod 116 preferably runs substantially the longitudinal length of the enclosed member 122 near four longitudinal edges of the part 10. Other locations, depending on the application, suitable for strength, connection points and conductivity are contemplated without departure from the scope of the present invention. More or less rods 116 are also contemplated depending on the application without departure from the scope of the present invention. While the cross section of the conductor rods 116 is preferably generally circular, it is understood that alternative cross sections are contemplated depending on the application without departure from the scope of the present invention. It is understood that the two-piece part 110 is exemplary, and, the invention is not limited to only a two piece composite front end carrier.

Figure 4A:
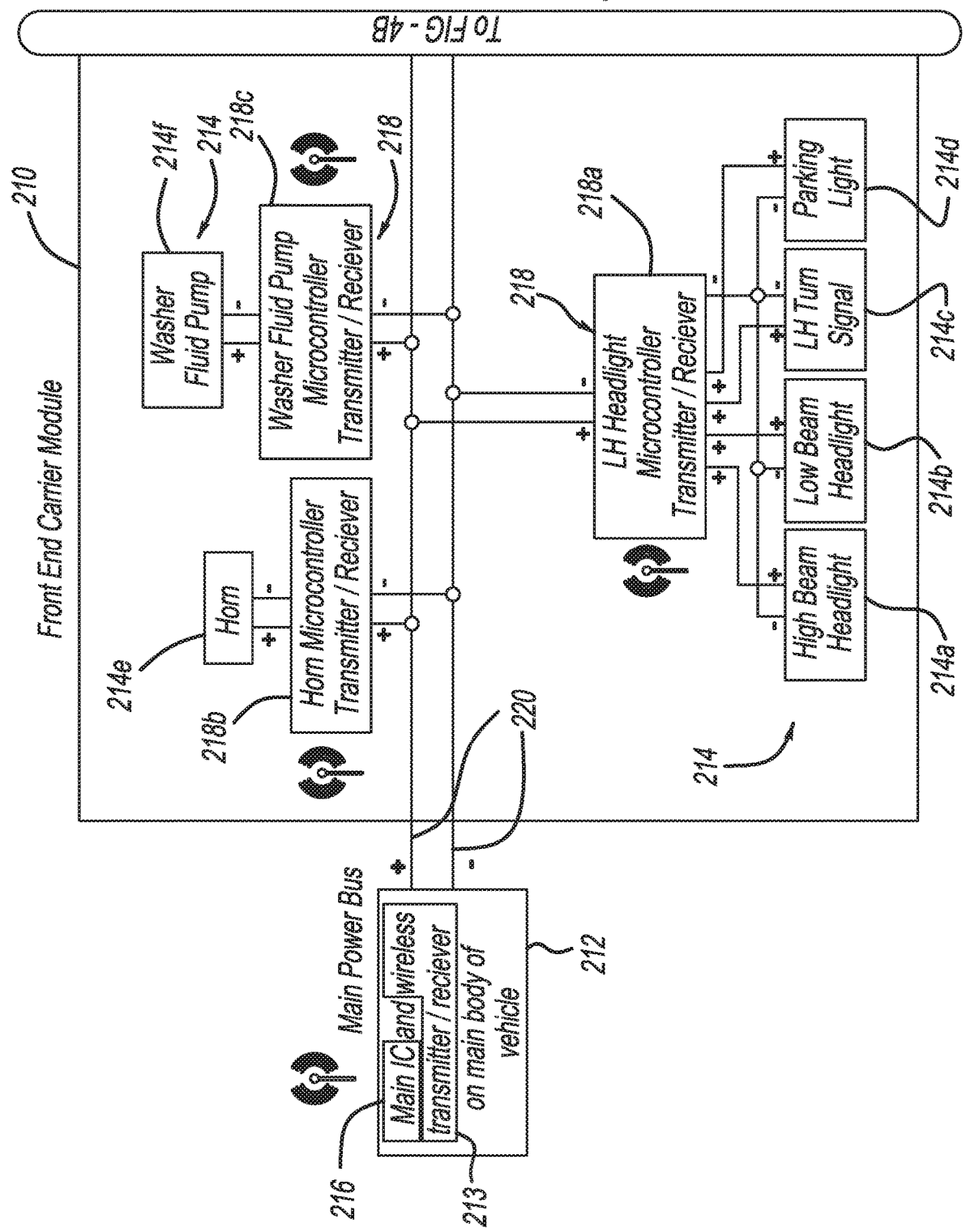
FIGS. 4a to 4b is an electrical schematic illustrating wiring for an exemplary module assembly including power bus conductors and having wireless communication, in accordance with an embodiment of the present invention; and, FIGS. 5a to 5b is an electrical schematic illustrating wiring for an exemplary module assembly including power and communication bus conductors, in accordance with another embodiment of the present invention.
Figure 4B:
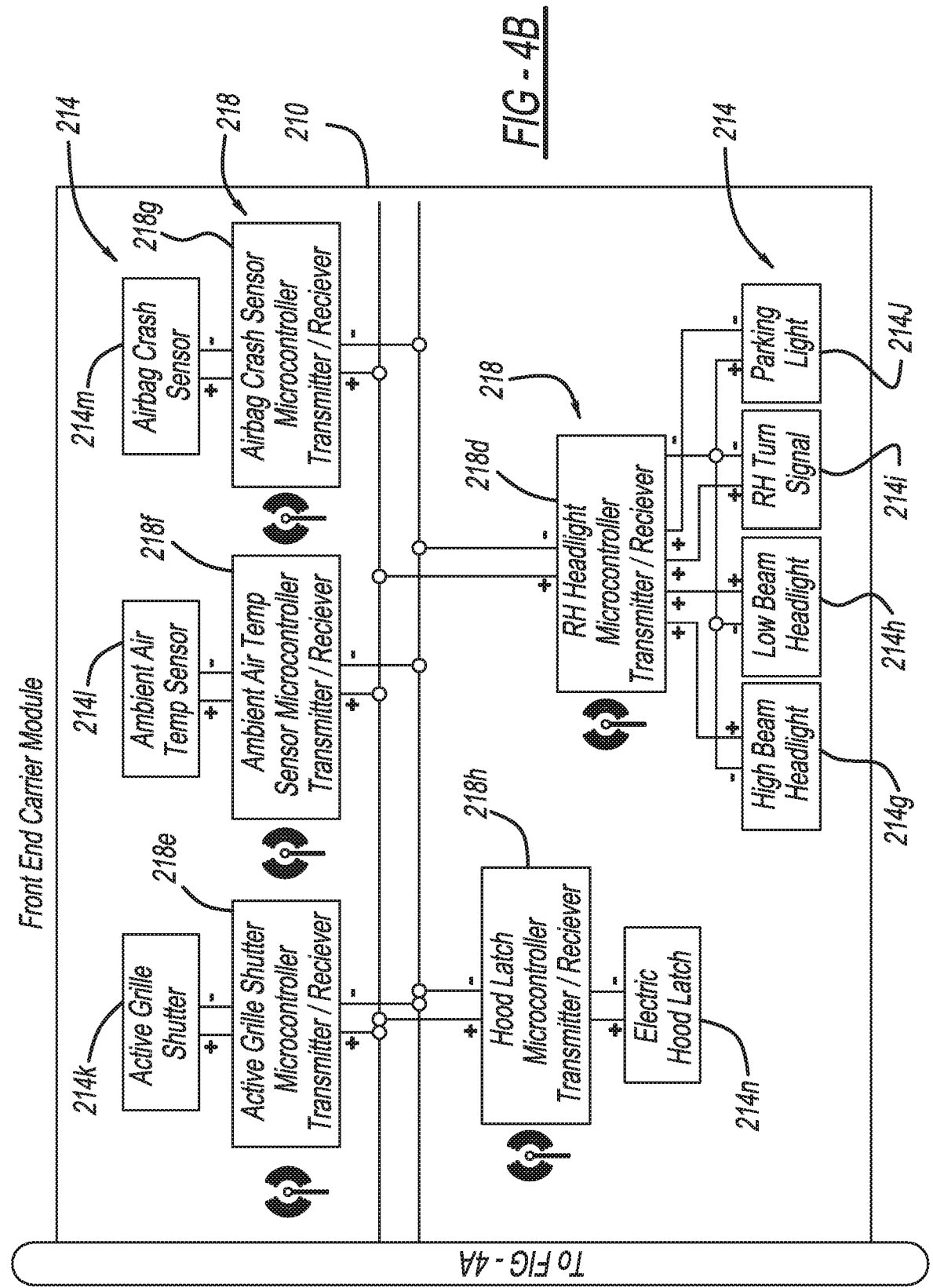

FIGS. 4a-4b depict an electrical schematic illustrating the wiring for a wireless module system. In a wireless electrical component module assembly 210, e.g., front end carrier module, communication bus conductors are not directly connected to the microcontroller on the electrical component. Rather, a wireless transmitter/receiver 213 selectively transmits signals from the main microcontroller 212 located on the main body of the vehicle to a plurality of electrical components shown generally at 214 operably connected to the module assembly 210. Control signals commonly sent to each of the electrical components 214 coupled to a module assembly 210, typically directly or using direct wire connections, are instead redirected to a main or master controller 216. The master controller 216 determines which electrical component 214 to activate and assigns an address or signature to target a specific electrical component 214. A plurality of microcontrollers or "slave controllers" shown generally at 218 are each operably connected to at least one respective electronic component 214, and each operably connected to the overmolded reinforcement conductor rods. The transmitter 213 submits the signal to a target slave controller 218 attached to the electrical component 214. Once the target slave controller 218 receives the signal, it will determine which sub electrical component 214 (for example low beam bulb on a head lamp assembly) to activate and send power to the component 214 via main power bus 220, preferably the main power bus being overmolded conductive reinforcement rods such as conductive rods 16b or 116b). It is understood that the module 210 is exemplary, and, the invention is not limited to only a front end carrier module.

Since the electrical component 214 is activated using a programmed slave controller 218, unique features can be implemented to reduce costs. For example, instead of using a headlamp bulb with high beam and low beam filaments, a single high beam filament or a LED bulb (light emitting diode) could be activated using Pulse Width Modulation (PWM) signals from the slave controller 218 that can be programmed to vary the amount of light for high and low beam applications. A specific signal sent to the master controller 216 will transmit to the target slave controller 218 and interpret which device 214 to activate and how much power to apply. Similarly for a signal light integrated into a headlamp assembly, a single filament or LED bulb could be activated using PWM signals from the slave controller 214 to vary the amount of power to the bulb based on time. This means a single bulb can be used for a parking and turn signal by programming the controllers accordingly.

Another feature includes feedback from the slave controller 218. Since all components 214 are digitally controlled, their operation could also be digitally monitored by the slave controller 218, according to an embodiment of the present invention. In the event that an electrical component 214 does not work, the controller 218 will detect a deviation in current draw, send a signal back to the master controller 216, and notify the vehicle operator (e.g., via dashboard warning light) that an electrical component 214 has failed.

Referring to FIGS. 1-3 generally, the rods 16, 116 are conductors and act as a reinforcement as well. The rods are formed of metal, steel, copper, metallic aluminum, carbon fiber, or any other suitably conductive and reinforcing material, and combinations thereof.

While 2 or 4 rods are shown or described, it is understood that more or less rods can be used depending on the applications without departing from the scope of the present invention. Rods are arranged along the longitudinal direction of the module, and/or, located at predetermined intervals depending on the application. Alternative arrangements are contemplated depending on the vehicle application without departing from the scope of the present invention.

The enclosure 22, 122 is generally formed of at least two halves, e.g., made of plastic and/or composite material, operably welded together, e.g., preferably an upper and lower half welded together with weld surfaces along the longitudinal length forming a generally substantially hollow enclosure. More or less are contemplated, e.g., one piece are more than two. Alternative or additional sections and weld locations depending on the application are contemplated without departing from the scope of the present invention. The enclosure is a beam or any other structure with predetermined shape and dimensions suitable as supporting member and provide electrical component carrier/activation. The enclosure can also be partly open or interior otherwise partly exposed.

Typical electrical components that can be activated on a module assembly using either wireless and/or a communication bus include, but are not limited to, horns, washer fluid pump, ambient temperature sensor, airbag crash sensor, LH headlamp assembly, electrical hood latch, RH headlamp assembly, coolant temp sensor, active grille shutter, etc. Any other module assembly of any kind is contemplated dependent upon the particular applications without departing from the scope of the present invention, including, but not limited to, front end carriers, rear carriers, instrument panel carriers, etc, and respective related electronics, etc.

FIGS. 4a-4b depict exemplary electrical components 214 and microcontrollers 218 or "slave controllers", however, more or less and alternative components and microcontrollers are contemplated depending on the application without departure from the scope of the present invention. A first microcontroller 218a (e.g., a left hand (LH) headlight microcontroller with a transmitter/receiver) attached to a plurality of electrical components 214. The signals are submitted between the transmitter 213 of the main microcontroller 212 and the first microcontroller 218a, wherein the microcontroller 218a will determine which sub electrical component 214 (e.g. high beam headlight 214a, low beam headlight 214b, LH turn signal 214c, parking light 214d, etc) to activate and send power via main power bus 220. Similarly, a second microcontroller 218b (e.g., a horn microcontroller with a transmitter/receiver) will determine which sub electrical component, e.g., horn 214e, to activate and send power via main power bus 220; and, similarly, third microcontroller 218c (e.g., a washer fluid pump microcontroller with a transmitter/receiver) will determine which sub electrical component, e.g., washer fluid pump 214f, to activate and send power via main power bus 220; and, a fourth microcontroller 218d (e.g., a right hand (RH) headlight microcontroller with a transmitter/receiver) will determine which sub electrical component 214 (e.g., high beam headlight 214g, low beam headlight 214h, RH turn signal 214I, parking light 214j, etc) to activate and send power via main power bus 220; and, fifth microcontroller 218e (e.g., an active grill shutter microcontroller with a transmitter/receiver) will determine which sub electrical component 214 (e.g., active grille shutter 214k) to activate and send power via main power bus 220; and, sixth microcontroller 218f (e.g., an ambient air temperature sensor microcontroller with a transmitter/receiver) will determine which sub electrical component 214 (e.g., ambient air temperature sensor 214I) to activate and send power via main power bus 220; and, seventh microcontroller 218g (e.g., an airbag crash sensor with a transmitter/receiver) will determine which sub electrical component 214 (e.g., airbag crash sensor 214M) to activate and send power via main power bus 220; and, an eight microcontroller 218h (e.g., a hood latch microcontroller with a transmitter/receiver) will determine which sub electrical component 214 (e.g., electric hood latch 214n) to activate and send power via main power bus 220.

Figure 5A:
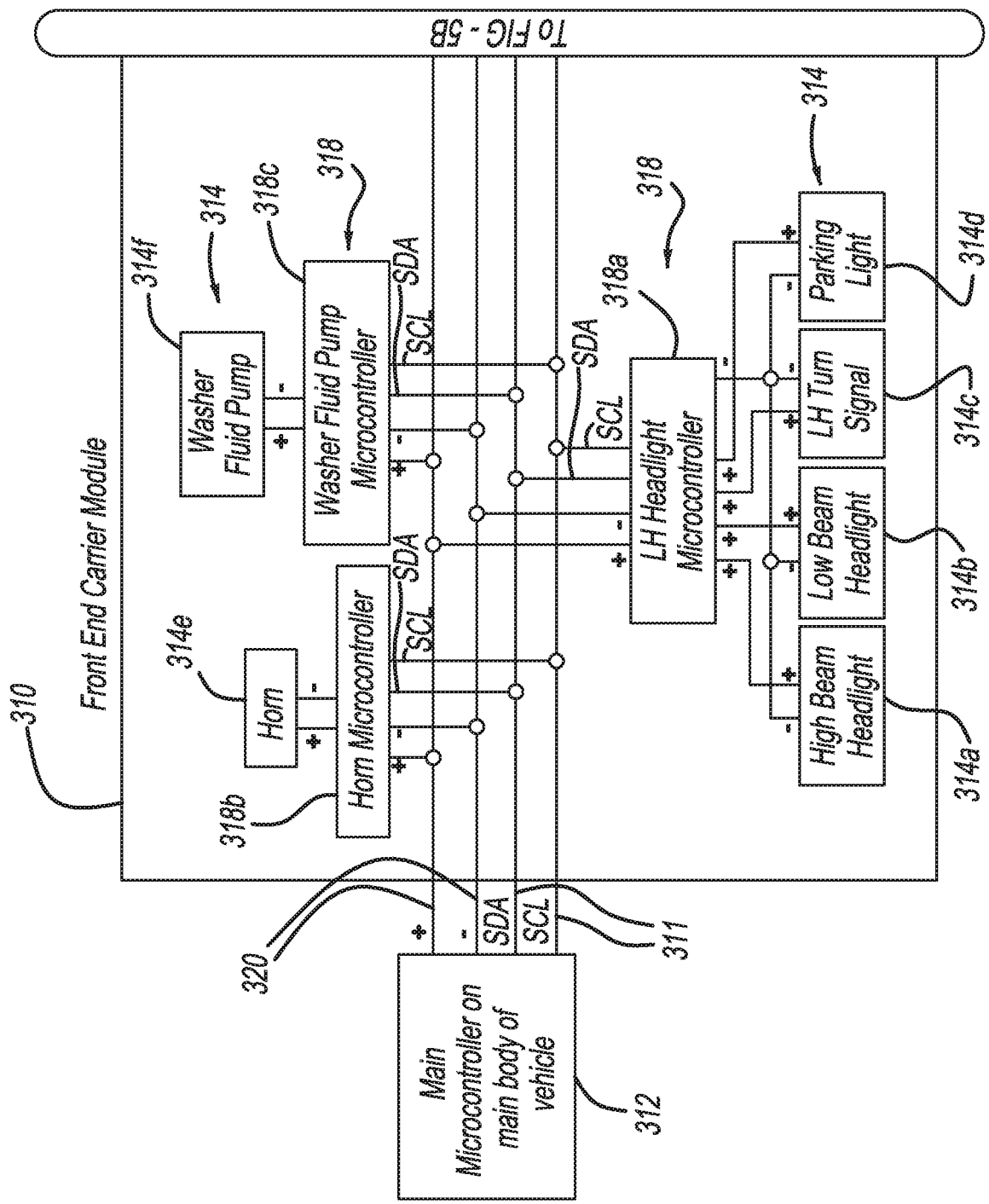
Figure 5B:
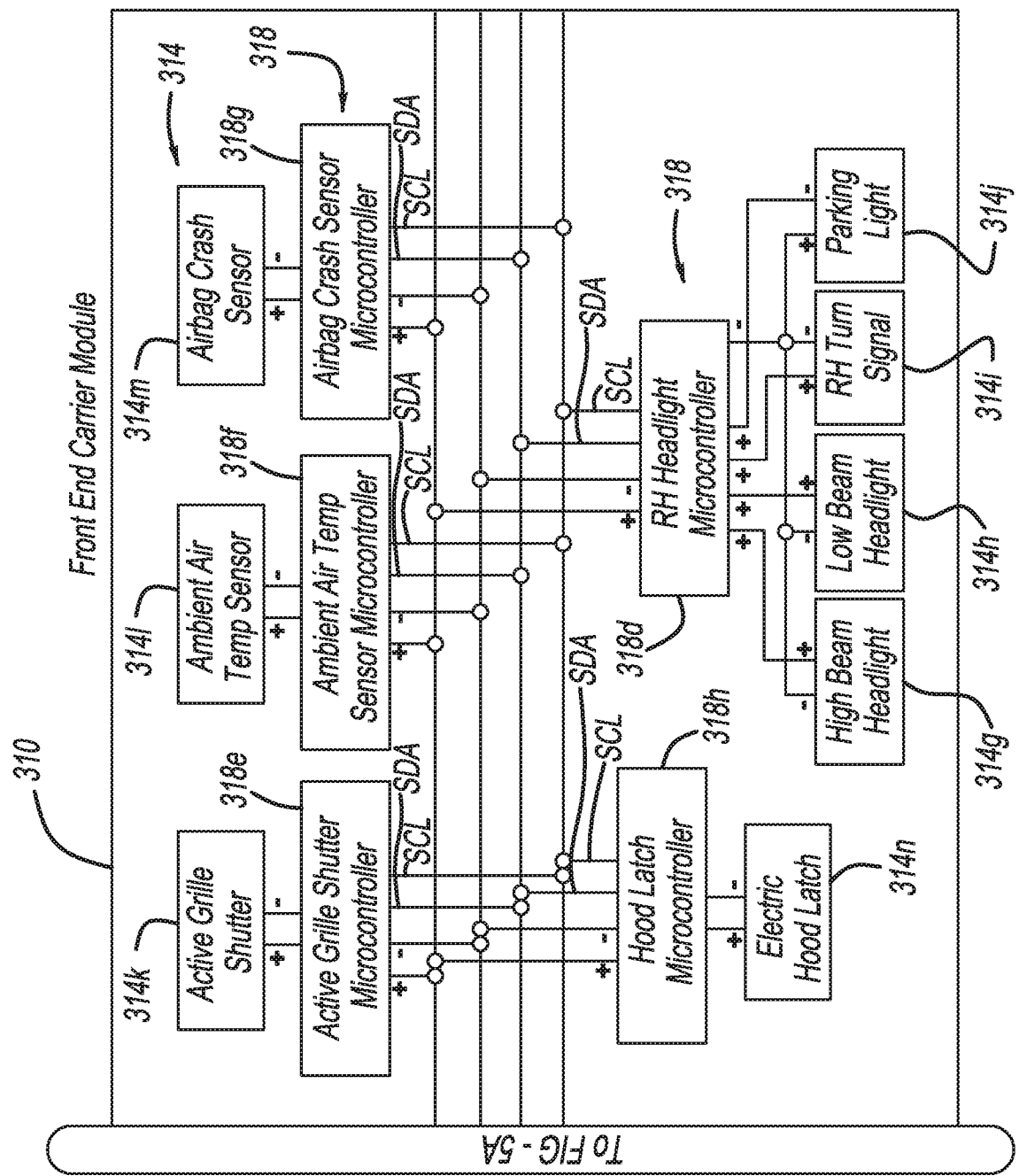

FIGS. 5a-5b depict an electrical schematic showing the wiring for a module 310, e.g., front end module, that is not wireless, according to another embodiment of the present invention. This embodiment utilizes two additional overmolded reinforcement conductor rods (e.g., communication bus conductors 16a or 116a) as a communication bus, indicated at 311, to send data to each of a plurality of microcontrollers 318; instead of wireless transmitters/receivers. Any of the common 2-wire communication protocols in use today, e.g., such as 12C or CAN bus, or in the future can be used to transmit signals from the main microcontroller 312 on the main body of the vehicle to the target slave controller 318 using assigned addresses. PWM features mentioned previously on the wireless component module 210 applies to the communication bus embodiment as well, according to an embodiment of the present invention. A plurality of microcontrollers or "slave controllers" shown generally at 318 are each operably connected to at least one respective electronic component 314, and each operably connected to the overmolded reinforcement conductor rods, e.g. communication bus conductors 311 and main power bus conductors 320. The electrical component 314 is activated using the slave controller 318 via main power bus 320, preferably the main power bus being overmolded conductive reinforcement rods such as voltage source conductor rods 116a or 116a. It is understood that the module 310 is exemplary, and, the invention is not limited to only a front end carrier module.

FIGS. 5a-5b depict exemplary electrical components 314 and microcontrollers 318, however, more or less and alternative components and microcontrollers are contemplated depending on the application without departure from the scope of the present invention. A ninth microcontroller 318 (e.g., a left hand (LH) headlight microcontroller) attached to a plurality of electrical components 314a to 314d. Control signals are submitted between the main microcontroller 312 and the ninth microcontroller 318a via the main communication bus 311, wherein the microcontroller 318a will determine which sub electrical component 314 (e.g., high beam headlight 314a, low beam headlight 314b, LH turn signal 314c, parking light 314d, etc) to activate and send power via main power bus 320. Similarly, a tenth microcontroller 318b (e.g., a horn microcontroller) will determine which sub electrical component, e.g., horn 314e, to activate and send power via main power bus 320; and, similarly, eleventh microcontroller 318c (e.g., a washer fluid pump microcontroller) will determine which sub electrical component, e.g., washer fluid pump 314f, to activate and send power via main power bus 320; and, a twelfth microcontroller 318d (e.g., a right hand (RH) headlight microcontroller) will determine which sub electrical component (e.g., high beam headlight 314g, low beam headlight 314h, RH turn signal 314l, parking light 314j, etc) to activate and send power via main power bus 320; and, thirteenth microcontroller 318e (e.g., an active grill shutter microcontroller) will determine which sub electrical component (e.g., active grille shutter 314k) to activate and send power via main power bus 320; and, fourteenth microcontroller 318f (e.g., an ambient air temperature sensor microcontroller) will determine which sub electrical component (e.g., ambient air temperature sensor 314*l*) to activate and send power via main power bus 320; and, fifteenth microcontroller 318*g* (e.g., an airbag crash sensor) will determine which sub electrical component (e.g., airbag crash sensor 314M) to activate and send power via main power bus 320; and, an sixteenth microcontroller 318*h* (e.g., a hood latch microcontroller) will determine which sub electrical component (e.g., electric hood latch 314*n*) to activate and send power via main power bus 320.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A front end carrier module assembly for a vehicle, comprising:
    a structural member;
    a plurality of conductive reinforcement rods overmolded in the structural member, wherein a first pair of the plurality of conductive reinforcement rods are main power conductors operable to activate at least one electrical component operably coupled to the structural member;
    a plurality of electrical connection points provided at pre-determined locations along the length of the structural member adapted for making electrical connections with respective electrical components;
    wherein the structural member is a two piece composite wherein at least two of the conductive reinforcement rods are overmolded directly within each of the composite pieces, and wherein the two pieces are welded together forming an enclosure having the conductive reinforcement rods operable to transmit power and communication data to each of the electrical components.

2. The front end carrier module assembly of claim 1, wherein there are a plurality of electrical components electrically operably coupled to the structural member.

3. The front end carrier module assembly of claim 1, wherein the at least one electrical component has wireless communication with a main microcontroller of the vehicle.

4. The front end carrier module assembly of claim 1, further comprising at least one slave controller connected to the at least one electrical component, wherein the slave controller receives control signals from a master controller of the vehicle and determines which of the at least one electrical components to activate and sends power to the respective at least one electrical components via the first pair of main power conductors.

5. The front end carrier module assembly of claim 4, wherein the at least one slave controller further comprises a transmitter/receiver to receive the control signals that were directed to the master controller from a wireless transmitter/receiver of a main microcontroller of the vehicle.

6. The front end carrier module assembly of claim 5, wherein the master controller is operable to determine which of the at least one electrical components to activate and assigns an address or signature to target a specific one of the electrical components for activation, which is transmitted to the slave controller connected to the specific electrical component.

7. The front end carrier module assembly of claim 4, wherein the at least one slave controller is a programmed slave controller that varies the amount of power to apply to the at least one electrical component.

8. The front end carrier module assembly of claim 4, where the at least one slave controller includes a feedback feature that monitors the power current draw of each of the at least one electrical components and sends a signal to the master controller when an electrical component fault condition occurs.

9. The front end carrier module assembly of claim 4, wherein the slave controller is selected from the group consisting of left hand headlight microcontroller, right hand headlight microcontroller, hood latch microcontroller, active grille shutter microcontroller, ambient air temperature microcontroller, airbag crash sensor microcontroller, horn microcontroller, washer fluid pump microcontroller and combinations thereof.

10. The front end carrier module assembly of claim 1, wherein the at least one electrical component is/are selectively activated with pulse width modulation control signals so that the amount of power applied to each electrical component can be varied as desired.

11. The front end carrier module assembly of claim 1, wherein the at least one electrical component is selected from the group consisting of a horn, washer fluid pump, ambient air temperature sensor, airbag crash sensor, left hand headlamp assemblies, right hand headlamp assemblies, high beam headlight, low beam headlight, electrical hood latch, left hand turn signal, right hand turn signal, parking light, coolant temperature sensor, active grille shutter and combinations thereof.

12. The front end carrier module assembly of claim 1, wherein a second pair of the plurality of conductive reinforcement rods are communication bus conductors operable to send control signals for activation of the at least one electrical component with power from the main power conductors.

13. The front end carrier module assembly of claim 12, further comprising at least one slave controller operably coupled to the at least one electrical component, wherein the slave controller receives control signals from a main microcontroller of the vehicle and determines which of the at least one electrical components to activate and sends power to the respective at least one electrical components via the first pair of main power conductors.

14. A front end carrier module subassembly for a vehicle, comprising:
    an enclosed structural member;
    a plurality of electrical components operably coupled to the enclosed structural member;
    a plurality of conductive reinforcement rods overmolded in the enclosed structural member, wherein at least two of the conductive reinforcement rods are voltage source conductors to selectively power the plurality electrical components;
    a plurality of electrical connection points provided at pre-determined locations along the length of the structural member adapted for making electrical connections with respective electrical components;
    a plurality of slave controllers, each operably coupled to at least one of the plurality of electrical components, wherein control signals are operably transmitted from a microcontroller of the vehicle, either wirelessly or by at least two additional of the conductive reinforcement rods that are communication bus conductors, to at least one predetermined slave controllers, wherein the slave controller is operable to determine which electrical component to activate and sends power to the electrical component;
    wherein the structural member is a two piece composite wherein at least two of the conductive reinforcement rods are overmolded directly within each of the composite pieces, and wherein the two pieces are welded together forming an enclosure having the conductive reinforcement rods operable to transmit power and communication data to each of the electrical components.

15. The front end carrier module subassembly of claim 14, wherein the controls signals are wirelessly transmitted, and wherein the plurality of slave controllers each further comprise a transmitter/receiver to receive the control signals that were first directed to a master controller from a wireless transmitter/receiver of a main microcontroller of the vehicle.

16. The front end carrier module subassembly of claim 14, wherein the control signals are transmitted via the at least two communication bus conductors, wherein the at least two communication bus conductors are operably connected to a main microcontroller of the vehicle.

17. The front end carrier module subassembly of claim 16, wherein the control signals are targeted to specific one or more of the plurality of slave controllers using assigned addresses for each electrical component for the targeted slave controller to determine which electrical component to activate.

18. A front end carrier module assembly for a vehicle having a main microcontroller, comprising:

a structural member including two halves of plastic and/or composite material operably connected together to form an enclosed structure;

at least two conductor rods overmolded within one of the halves of the structural member, wherein the at least two conductor rods are positive and negative main power bus conductors;

at least two additional conductor rods overmolded within the other half of the structural member, wherein the at least two additional conductor rods are communication bus conductors;

a plurality of electrical connection points provided at pre-determined locations along the length of the structural member adapted for making electrical connections with respective electrical components;

a plurality of slave controllers adapted to operably couple to the electrical components;

wherein control signals from a main microcontroller on a main body of the vehicle are selectively transmitted to and interpreted by the plurality of slave controllers, which slave controller determines which electrical component to send power to from the main power bus conductors.

* * * * *